J. M. R. MOURAS.
AUTOMOBILE VEHICLE.
APPLICATION FILED MAY 22, 1918.
1,285,317.
Patented Nov. 19, 1918.
2 SHEETS—SHEET 1.
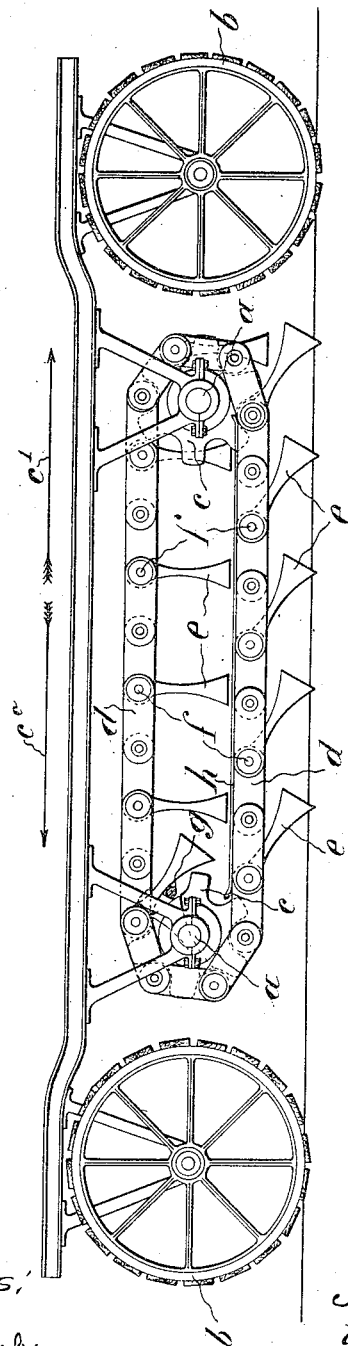
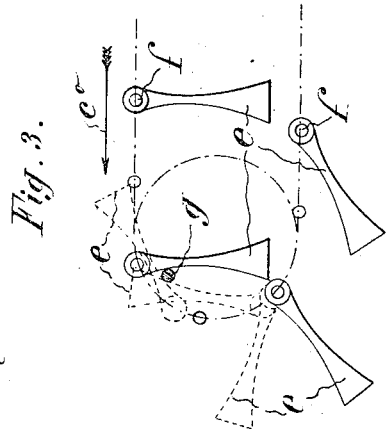
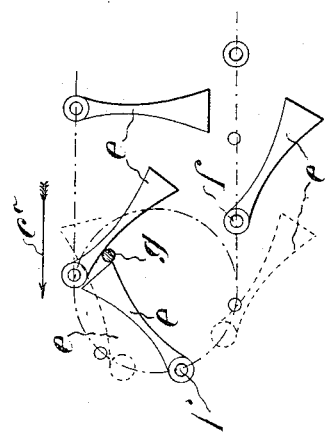
Inventor
Jean Marie Rene Mouras

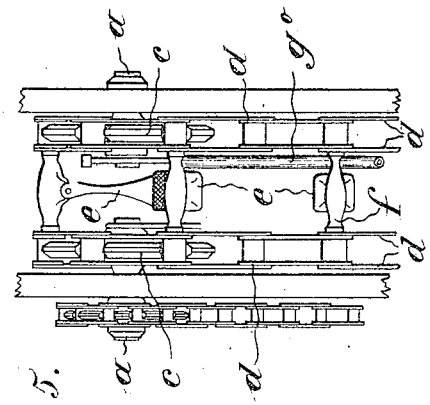
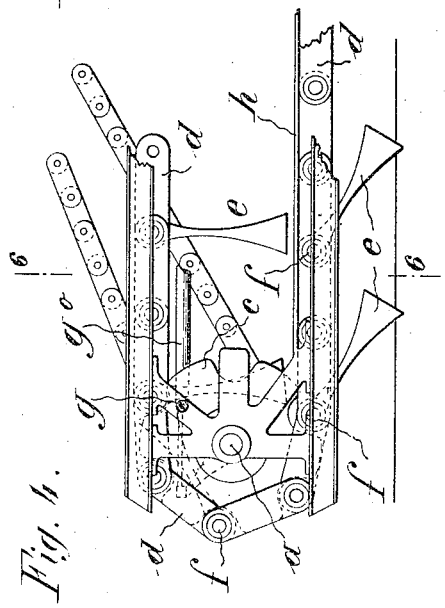
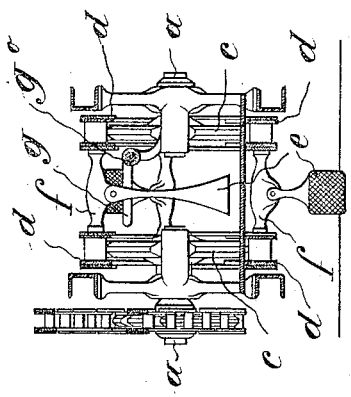

UNITED STATES PATENT OFFICE.

JEAN MARIE RENÉ MOURAS, OF PLAILLY, FRANCE.

AUTOMOBILE-VEHICLE.

1,285,317.  Specification of Letters Patent.  Patented Nov. 19, 1918.

Application filed May 22, 1918. Serial No. 236,006.

*To all whom it may concern:*

Be it known that I, JEAN MARIE RENÉ MOURAS, farmer, citizen of the French Republic, residing at Plailly, Department of Osie, France, have invented certain new and useful Improvements in Automobile-Vehicles, of which the following is a specification.

This invention relates to automobile vehicles and refers more particularly, although not exclusively to tractors.

It has for its principal object to so construct vehicles of the class in question that their propulsion may be effected in a more simple manner than has hitherto been the case.

The invention consists essentially in providing, for effecting the propulsion of vehicles of the class in question, an endless chain, upon which are pivoted "crutches" or devices for coming into contact with the ground, the said crutches coming into contact with the ground at an appropriate angle for effecting the propulsion.

The invention includes certain constructional methods of carrying the same into effect which will be explained more fully hereafter.

In order that the said invention may be clearly understood, I will now proceed to describe the same with reference to the accompanying drawing which is however given merely by way of example.

Figure 1 shows diagrammatically and in side elevation the propulsion mechanism of a tractor constructed according to my said invention.

Figs. 2 and 3 show diagrammatically and in side elevation certain positions taken up by the operating parts of the propulsive mechanism.

Figs. 4, 5 and 6 show respectively, to the same scale a side elevation, a plan and a vertical section on the line 6—6 Fig. 4, of a detail of the propulsive mechanism.

In the method of carrying the invention into effect illustrated in the drawing, where, as previously stated it is shown as applied to a tractor, I fit, at a suitable height, upon the tractor, two axles *a*, parallel to one another and at right angles to the longitudinal direction of the tractor. These axles are so located that they come between the axles of the wheels *b* of the vehicle.

I mount loosely upon the said axles two sprocket wheels *c*, and around these sprocket wheels *c* I pass an endless chain *d*.

*e* are crutches, constructed of any suitable rigid material. Each crutch is preferably shaped with a widened portion at one extremity, as shown. The other extremity is provided with a pivot pin *f* by which it is pivoted to the chain *d*, the crutches being pivoted at suitable distances apart, so that they come normally in the longitudinal plane of the tractor. The arrangement is moreover such that the crutches *e* when displaced and drawn along by the chain do not come into contact with any object which would impede their movement.

It follows from the foregoing that if the distance between the two lengths of the chain is greater than the height or length of a crutch *e* and that if the distance between the lower length of the chain and the ground is less than that height or length, the crutches *e* suspended from the upper length of the chain will hang vertically, while those suspended from the lower length of the chain will come into contact with the ground in an oblique position. I prefer to give to the crutches a length approximately equal to the diameters of the sprocket wheels *c*.

I further provide appropriate means and gearing for connecting one or other of the sprocket wheels *c* to the motor of the tractor. This means may be so located and arranged that, for instance, the rear sprocket wheel is operated when it is required to move forward, and the forward sprocket wheel when it is desired to move backward, the movement being in all cases so transmitted that the upper length of the chain is moved in the direction in which it is reqired to move the tractor.

In order that, as the chain *d* moves around the sprocket wheels *c*, the crutches may come successively into contact with the ground, in the proper position, I prefer to provide, as shown at Fig. 2, a stop or projection *g*, located near the sprocket wheel being in front of the stop in the direction of motion so that when the portion of the chain carrying the pivot pin of a crutch passes above the stop, the crutch comes against the projection and is held up thereby and is not lowered directly to the ground, but slips off at the proper time to come down upon the ground at the required angle.

With this construction, supposing it is required to move the tractor forward, I drive the chain by means of the rear sprocket wheel in the direction of the arrow $c^0$, and by reason of the projection $g$ located in the neighborhood of the front sprocket wheel, the crutches are compelled to come successively into contact with the ground at a relatively acute angle and to take up a position in which they are inclined from the upper part downward and from the front toward the back, as considered from the direction of motion. The lower extremity of each of the crutches digs into the ground. The crutches themselves remain in position, the movement of the chain causing the movement of the tractor.

On the other hand, when it is required to move backward, I turn the front sprocket wheel so that the chain moves in the opposite direction, and I provide another projection $g$ in the neighborhood of the back sprocket wheel. The direction of the chain is shown by the arrow $c^1$.

It is to be observed that when the direction of movement is altered, the crutches which have been digging into the ground during the movement in the previous direction, turn upon their ends and are then withdrawn from the ground and pass away over the sprocket wheel toward which they were previously pointing.

When the tractor is required to go down hill, it is generally desirable for the crutches to take up a position in which they exert a retaining action. With this object in view, the projection $g$ is so placed that the crutches overbalance as shown at Fig. 3, so that when they come into contact with the ground, they are inclined in a direction from above downward and from the rear toward the front. In this way, the crutches act to a certain extent to oppose a too rapid descent of the tractor. As in this case the tension of the driving chain operates on the sprocket wheel which is not driving, it is desirable to provide brake mechanism in connection with the sprocket wheels.

It will be seen that the various overbalancing movements of the crutches are caused by the said crutches coming into contact with the projections $g$, and I may either provide a single or double acting control. The control may be effected by a pin $g^0$, adapted to slide longitudinally, see especially Figs. 4–6, and having a projecting portion $g$ formed by bending the extremity of the pin at right angles. The pin is capable of turning through a quarter turn.

It follows from this that I can arrange so that the projections come into various positions by sliding the pins through an appropriate distance and turning the bent over portions.

For enabling the tractor to turn, I prefer to arrange for the two pairs of wheels of the tractor to determine the direction of motion, and for this purpose I resort to any of the well known systems of irreversible steering.

For the purposes of road traction, the back wheels alone may be steering wheels, the forward set being held normally in a mean position. For movements backward and forward or for moving around in curves, I may arrange that both the front and back wheels are steering wheels. In some cases they may be set in the same direction and in others in opposite directions.

In order to enable the crutches not only not to impede the turning but even to assist it, the said crutches may be provided with Cardan or flexible joints, so that the crutches after overbalancing or slipping down are free to move in any direction and become inclined on touching the ground toward the interior of the curve, thus taking up favorable positions on the ground for effecting the turning movement.

With the construction described, the action of the crutches coming into contact with the ground for moving or holding the tractor is similar to the action of the limbs of a draft animal pulling with all its force to move or hold the vehicle, and by carefully selecting the proper angle of operation upon the ground, the traction is effected under favorable condition by means of the chain and crutch mechanism, that is under far better conditions than with motive wheels or by means of "caterpillar" chains, these systems having the drawback that the parts become filled with mud, causing the propulsive members to slip, especially when the tractors have to move over arable land, which is more or less slimy, as in the case of tractors for agricultural purpose.

In some cases, in addition to providing the construction already explained, in order to give greater strength to the propulsive system, I may use two chains $d$, as shown in Figs. 4, 5 and 6, of the same length and parallel to one another, moving with the same velocity and interconnected by the axles carrying the crutches.

With this construction the crutches do not project from the sides as with the previous constructions. The two sprocket wheels opposite to one another are then mounted on independent axles so placed as to allow for the free movement of the crutches between the sprocket wheels. Each of the chains comprises preferably its own controlling or operating means which may be of any usual type and may include a differential to allow for turning.

In order to prevent overstrain of the chains and to give the crutches a constant inclination on the ground, I may provide a longitudinally extending rigid member $h$, so located that the heads of the crutches which are in contact with the ground come against the said member.

I prefer to provide between the wheels and the chassis buffering springs in such a way that they equalize the pressure exerted on the ground by the wheels and the crutches, the said springs increasing or diminishing the effect of the weight on the crutches or producing a re-distribution of a portion of the weight of the tractor, especially when turning or passing over uneven surfaces.

It is to be understood that the invention is not limited in any way to the method of carrying the same into effect which has been more particularly described. For instance, in some cases a plurality of the propulsive chains and crutches may be arranged parallel to one another on the same vehicle.

In general the invention includes all modifications coming within a fair interpretation of the appended claims.

What I claim and desire to secure by Letters Patent of the United States of America is:—

1. In automobile vehicles, a propulsive system comprising in combination two sprocket wheels arranged in the longitudinal direction of the vehicle and at the same height from the ground, an endless chain passing around the said sprocket wheels; pivoted crutches, each crutch being pivoted at one end to the chain, the parts being so proportioned and the apparatus so arranged that the crutches traveling along the upper length of chain do not come into contact with the lower length and those traveling along the lower length of chain come into contact with the ground in an oblique position, means for holding up each crutch in the neighborhood of the sprocket wheel and for releasing it so that it drops in an oblique position and means for driving the chain, substantially as described.

2. In an automobile vehicle, a propulsive system comprising in combination two sprocket wheels arranged in the longitudinal direction of the vehicle and at the same height from the ground, an endless chain passing around the said sprocket wheels, pivoted crutches, each crutch being pivoted at one end to the chain, the parts being so proportioned and the apparatus so arranged that the crutches traveling along the upper length of chain do not come into contact with the lower length and those traveling along the lower length of chain come into contact with the ground in an oblique position, an adjustable stop in the neighborhood of the sprocket wheel for holding up each crutch and for releasing it at the proper times so that it drops in an oblique position, and means for driving the chain substantially as described.

3. In an automobile vehicle, a propulsive system comprising in combination two sprocket wheels arranged in the longitudinal direction of the vehicle and at the same height from the ground, an endless chain passing around the said sprocket wheels, pivoted crutches, each crutch being pivoted by means of a universal joint at one end to the chain, the parts being so proportioned and the apparatus so arranged that the crutches traveling along the upper length of chain do not come into contact with the lower length and those traveling along the lower length of chain, come into contact with the ground in an oblique position, an adjustable stop in the neighborhood of the sprocket wheel for holding up each crutch and for releasing it at the proper time so that it drops in an oblique position and means for driving the chain, substantially as described.

4. In an automobile vehicle, a propulsive system comprising in combination two sprocket wheels arranged in a longitudinal direction of the vehicle and at the same height from the ground, an endless chain passing around the said sprocket wheels, pivoted crutches, each crutch being pivoted at one end to the chain, the parts being so proportioned and the apparatus so arranged that the crutches traveling along the upper length of chain do not come into contact with the lower length and those traveling along the lower length of chain come into contact with the ground in an oblique position, means for holding up each crutch in the neighborhood of the sprocket wheel and for releasing it so that it drops in an oblique position, a longitudinal member against which the upper end of the lower crutches come into contact and means for driving the same, substantially as described.

In testimony whereof I have hereunto set my hand in presence of two subscribing witnesses.

JEAN MARIE RENÉ MOURAS.

Witnesses:
 EUGÈNE JULLIEN,
 CHAS. P. PRESSLY.